United States Patent
Oh et al.

(10) Patent No.: US 11,820,378 B2
(45) Date of Patent: Nov. 21, 2023

(54) APPARATUS FOR ASSISTING LANE CHANGE, VEHICLE, SYSTEM HAVING THE SAME, AND METHOD THEREOF

(71) Applicants: HYUNDAI MOTOR COMPANY, Seoul (KR); KIA MOTORS CORPORATION, Seoul (KR)

(72) Inventors: Dong Eon Oh, Seoul (KR); Hoi Won Kim, Seoul (KR); Doo Jin Um, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 764 days.

(21) Appl. No.: 16/860,584

(22) Filed: Apr. 28, 2020

(65) Prior Publication Data
US 2021/0155246 A1    May 27, 2021

(30) Foreign Application Priority Data
Nov. 25, 2019    (KR) .................. 10-2019-0152534

(51) Int. Cl.
*B60W 30/18* (2012.01)
*B60Q 1/34* (2006.01)
*B60W 30/095* (2012.01)
*B60W 50/14* (2020.01)

(52) U.S. Cl.
CPC ......... *B60W 30/18163* (2013.01); *B60Q 1/34* (2013.01); *B60W 30/095* (2013.01); *B60W 50/14* (2013.01)

(58) Field of Classification Search
CPC .......... B60W 30/095; B60W 30/0953; B60W 30/0956; B60W 30/08; B60W 30/18163; B60W 50/14; B60W 2050/146; B60W 50/16; B60W 2540/20; B60W 2552/53; B60W 2554/801; B60W 2050/143; B60W 2520/06; G08G 1/167; B62D 15/0255; B60Q 1/34; B60Q 1/346; B60Q 1/14; B60Q 9/008; B60Y 2300/08; B60Y 2300/18166
See application file for complete search history.

(56) References Cited

U.S. PATENT DOCUMENTS

| | | | | |
|---|---|---|---|---|
| 6,405,132 B1* | 6/2002 | Breed | .................. | B60N 2/2863 701/45 |
| 11,396,296 B2* | 7/2022 | Tsuji | ............... | B60W 30/18163 |
| 2005/0060069 A1* | 3/2005 | Breed | .................... | G08G 1/166 701/408 |
| 2015/0081211 A1* | 3/2015 | Zeng | .................... | G05D 1/0212 701/446 |

(Continued)

*Primary Examiner* — Angelina Shudy
(74) *Attorney, Agent, or Firm* — LEMPIA SUMMERFIELD KATZ LLC

(57) ABSTRACT

An apparatus for assisting a lane change includes: a storage configured to store information for the lane change; and a processor that classifies a plurality of lane change steps for the lane change from a position of a host vehicle in an original lane to a target lane, and determines whether to output a warning of a dangerous situation in each lane change step of the plurality of lane change steps when the dangerous situation occurs. When the host vehicle is positioned on a boundary line of the target lane or goes over the boundary line of the target lane, the processor assists the lane change without outputting the warning based on a driving situation.

19 Claims, 7 Drawing Sheets

(56) References Cited

U.S. PATENT DOCUMENTS

| | | | |
|---|---|---|---|
| 2015/0266486 A1* | 9/2015 | Silvlin | B60W 50/10 |
| | | | 701/70 |
| 2016/0225261 A1* | 8/2016 | Matsumoto | B62D 15/0255 |
| 2016/0304097 A1* | 10/2016 | Taira | B60W 10/20 |
| 2017/0003683 A1* | 1/2017 | Sato | B60W 30/12 |
| 2017/0043780 A1* | 2/2017 | Yoon | B60W 30/18163 |
| 2017/0235313 A1* | 8/2017 | Sakamoto | G08G 1/04 |
| | | | 701/41 |
| 2017/0267237 A1* | 9/2017 | Oyama | B60W 10/18 |
| 2018/0201270 A1* | 7/2018 | Kang | B62D 15/025 |
| 2018/0346027 A1* | 12/2018 | Fujii | B60Q 9/00 |
| 2019/0100211 A1* | 4/2019 | Liu | B60W 10/20 |
| 2019/0212749 A1* | 7/2019 | Chen | G05D 1/0221 |
| 2019/0263411 A1* | 8/2019 | Saikyo | B60W 30/18163 |
| 2020/0247412 A1* | 8/2020 | Wang | G02B 27/01 |
| 2020/0361453 A1* | 11/2020 | Park | B60W 30/18163 |
| 2020/0406921 A1* | 12/2020 | Hirano | B60W 30/12 |
| 2021/0016783 A1* | 1/2021 | Watanabe | B60W 40/09 |
| 2021/0402999 A1* | 12/2021 | Park | B60W 50/0098 |
| 2022/0001867 A1* | 1/2022 | Hashimoto | B60W 30/18163 |
| 2022/0055481 A1* | 2/2022 | Shimizu | B60K 35/00 |
| 2022/0055619 A1* | 2/2022 | Yang | B60W 50/14 |
| 2022/0073090 A1* | 3/2022 | Kakeshita | B60W 50/14 |
| 2022/0126823 A1* | 4/2022 | Lu | B60W 30/12 |
| 2022/0126851 A1* | 4/2022 | Lu | B60W 50/16 |
| 2022/0176956 A1* | 6/2022 | Kakeda | B60W 50/085 |
| 2022/0185298 A1* | 6/2022 | Chen | B60W 10/20 |
| 2022/0340166 A1* | 10/2022 | Kume | G08G 1/0962 |
| 2022/0381579 A1* | 12/2022 | White | B62D 15/025 |
| 2022/0402515 A1* | 12/2022 | Aono | B60W 50/045 |

\* cited by examiner

APPARATUS FOR ASSISTING LANE CHANGE, VEHICLE, SYSTEM HAVING THE SAME, AND METHOD THEREOF

CROSS-REFERENCE TO RELATED APPLICATION

This application claims priority to and the benefit of Korean Patent Application No. 10-2019-0152534, filed on Nov. 25, 2019, the entire contents of which are incorporated herein by reference.

FIELD

The present disclosure relates to an apparatus (lane change assisting apparatus) for assisting a lane change, a vehicle system having the same, and a method thereof, and more particularly to a technology of warning collision when assisting a lane change.

BACKGROUND

The statements in this section merely provide background information related to the present disclosure and may not constitute prior art.

As Driver Assistance Systems have been advanced, the Driver Assistance Systems may interfere with driver assistance and safety systems which have been conventionally mass-produced. For example, we have discovered that a lane change assist function, which is a function of automatically changing a lane using the input of a driver or route setting by the driver, may conflict with an operating condition for other systems, such as (Lane Departure Warning (LDW), Lane Keeping Assist (LKA), or Blind-spot Collision Warning (BCW) which are driver assistance and safety systems for keeping the lane, thereby causing the interference or errors between the systems.

In particularly, the BCW is a system to generate a warning of the collision with a surrounding vehicle based on the assumption that a lane is changed in the same direction as a direction indicated by a turn indicator when the turn indicator is flickered. We have found that the conditions to operate the BCW may conflict with the operating condition for the lane change assist function which has to flicker the turn indicator during automatic lane change.

SUMMARY

The present disclosure provides an apparatus for assisting a lane change, capable of enhancing the convenience of a driver by determining an unnecessary warning output situation in each lane change step and performing the lane change without warning, a vehicle system having the same, and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for assisting a lane change may include: a storage configured to store information for the lane change; and a processor that classifies a plurality of lane change steps for the lane change from a position of a host vehicle in an original lane to a target lane, determines whether to output a warning of a dangerous situation in each lane change step of the plurality of lane change steps, and assists the lane change without outputting the warning based on a driving situation when the host vehicle is positioned on a boundary line of the target lane or goes over the boundary line of the target lane.

According to one form, when the host vehicle is positioned on the boundary line of the target lane, the processor may determine whether to output the warning based on an elapsed time or a position of a center of the host vehicle after the host vehicle is positioned on the boundary line of the target lane.

According to another form, the processor may assist the lane change without outputting the warning when the elapsed time exceeds a preset time or the position of the center of the host vehicle after the host vehicle is positioned on the boundary line of the target lane exceeds a preset reference value.

According to other form, the processor may assist the lane change without outputting the warning when the host vehicle is entirely positioned inside the target lane.

According to one form, the processor may output the warning when the warning is being output immediately before the host vehicle is entirely positioned inside the target lane, or when flickering of a turn indicator is sensed after the host vehicle is entirely positioned inside the target lane.

According to another form, the plurality of lane change steps includes: a first step in which the host vehicle continues to follow a center of the original lane; a second step in which the host vehicle moves from the center of the original lane to the target lane until a first tire among a plurality of tires of the host vehicle begins to cross the boundary line of the target lane; a third step in which the first tire of the host vehicle is positioned on the boundary line of the target lane and the host vehicle continues to move toward the target lane until each tire of the plurality of tires of the host vehicle crosses the boundary line of the target lane; and a fourth step in which each tire of the plurality of tires of the host vehicle has crossed the boundary line of the target lane and the host vehicle continues to move until the first tire of the host vehicle enters the center of the target lane.

According to one form, the processor may output the warning when the dangerous situation occurs and control the host vehicle to return to the original lane, in the first step or the second step.

According to one form, the processor may output the warning and continuously perform lane change control, in the third step.

According to one form, the processor may continuously perform the lane change without outputting the warning, in the fourth step.

According to one form, the processor may perform the lane change without outputting the warning when an elapsed time after entering into the third step exceeds a preset time, or when a position of a center of the host vehicle inside the target lane exceeds a preset reference value, in the third step.

According to one form, the processor may output the warning and continuously perform the lane change when an elapsed time after entering into the third step does not exceed a preset time, and when a position of a center of the host vehicle inside the target lane does not exceed a preset reference value.

According to one form, the processor may continuously flicker a turn indicator until completion of the lane change from a time point of starting the lane change.

According to another aspect of the present disclosure, a vehicle system may include: a lane change assisting apparatus configured to: divide a lane change from an original lane in which a host vehicle is currently driving to a target lane to which the host vehicle makes a lane change into a plurality of lane change steps, control a warning of a dangerous situation in each lane change step of the plurality of lane change steps, and assist the lane change without outputting the warning based on a driving situation when the host vehicle is positioned on a boundary line of a target lane or goes over the boundary line of the target lane; and a warning device controlled by the lane change assisting apparatus to output the warning.

According to one form, the warning device may include Blind-spot Collision Warning (BCW).

According to one form, the warning device may control a type of the warning or an intensity of the warning based on the driving situation.

According to still another aspect of the present disclosure, a method for assisting a lane change, may include: classifying, by a processor, a plurality of lane change steps for the lane change from a position of a host vehicle in an original lane to a target lane; and determining, by the processor, whether to output a warning of a dangerous situation in each lane change step of the plurality of lane change steps; and when the host vehicle is positioned on a boundary line of a target lane or goes over the boundary line of the target lane, assisting, by the processor, the lane change without outputting the warning based on a driving situation.

According to one form, assisting the lane change without outputting the warning may include: assisting the lane change without outputting the warning when the host vehicle is entirely inside the target lane; and when the host vehicle is positioned on the boundary line of the target lane, determining whether to output the warning based on an elapsed time or a position condition of a center of the host vehicle after the host vehicle is positioned on the boundary line of the target lane.

According to another form, assisting the lane change without outputting the warning may include: when an elapsed time exceeds a preset time or a position of a center of the host vehicle after the host vehicle is positioned on the boundary line of the target lane exceeds a preset reference value, assisting the lane change without outputting the warning.

According to one form, the plurality of lane change steps may include: a first step in which the host vehicle continues to follow a center of an original lane; a second step in which in which the host vehicle moves from the center of the original lane to the target lane until a first tire among a plurality of tires of the host vehicle begins to cross the boundary line of the target lane; a third step in which the first tire of the host vehicle is positioned on the boundary line of the target lane and the host vehicle continues to move toward the target lane until each tire of the plurality of tires of the host vehicle crosses the boundary line of the target lane; and a fourth step in which each tire of the plurality of tires of the host vehicle has crossed the boundary line of the target lane and the host vehicle continues to move until the first tire of the host vehicle enters a center of the target lane.

According to another form, the method may further include continuously flickering, by the processor, a turn indicator until completion of the lane change from a time point of starting the lane change.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

The above and other objects, features and advantages of the present disclosure will be more apparent from the following detailed description taken in conjunction with the accompanying drawings.

Figure 1:
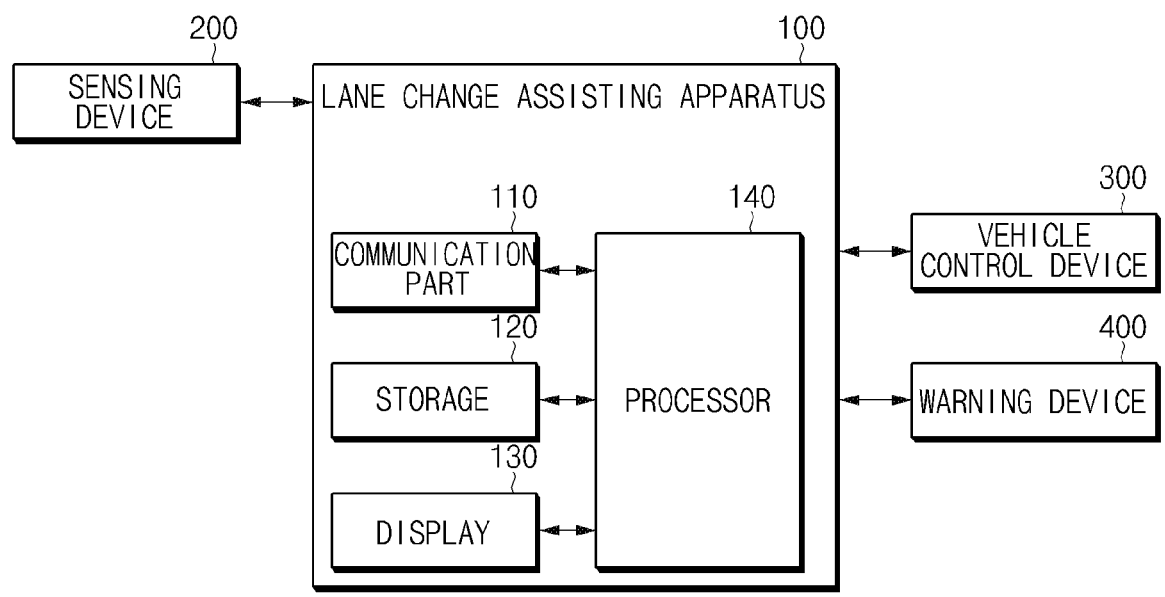
FIG. 1 is a block diagram illustrating the configuration of a vehicle system including a lane change assisting apparatus.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the form of the present disclosure, a detailed description of well-known features or functions will be ruled out in order not to unnecessarily obscure the gist of the present disclosure.

In describing the components of the form according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure discloses a technology of reducing or minimizing unnecessary warning by preventing collision warning from being performed when a host vehicle is positioned on the boundary line of the target lane and a specific condition is satisfied, or when a specific condition is satisfied even though a turn indicator is being flickered through a function of assisting a lane change when the host vehicle is completely inside the target lane.

Hereinafter, forms of the present disclosure will be described with reference to FIGS. 1 to 7.

Figure 2:
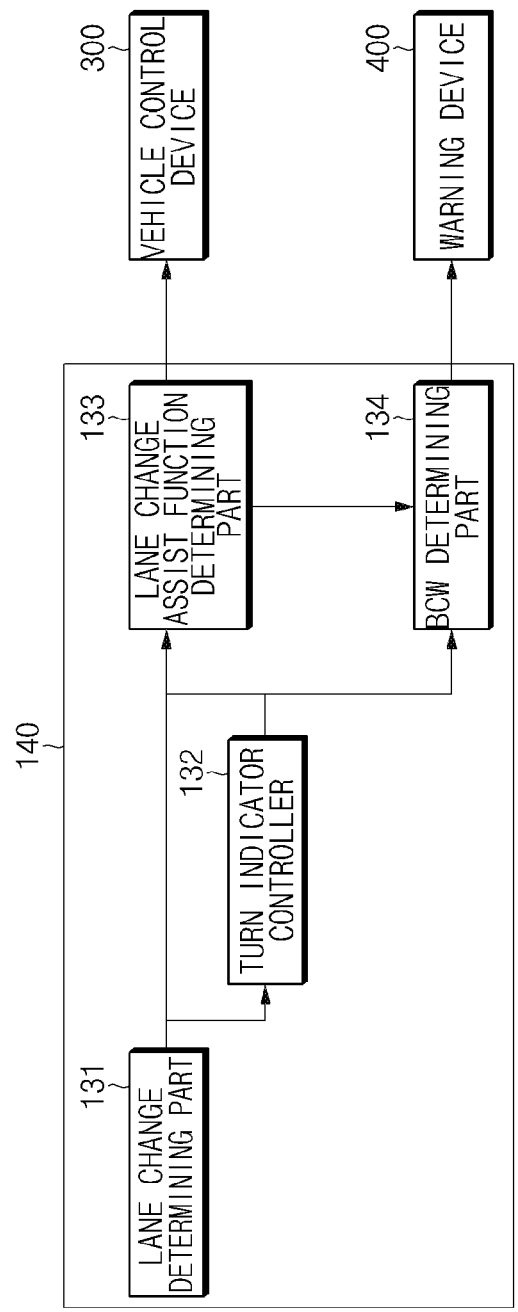
FIG. 2 is a block diagram illustrating the detailed configuration of the lane change assisting apparatus.

FIG. 1 is a block diagram illustrating the configuration of a vehicle system including a lane change assisting apparatus, according to a form of the present disclosure, and FIG. 2 is a block diagram illustrating the detailed configuration of the lane change assisting apparatus, according to a form of the present disclosure.

Referring to FIG. 1, according to a form of the present disclosure, the vehicle system may include a lane change assisting apparatus 100, a sensing device 200, a vehicle control device 300, and a warning device 400.

According to a form of the present disclosure, the lane change assisting apparatus 100 may be implemented inside a vehicle. In this case, the lane change assisting apparatus 100 may be implemented integrally with internal control units of the vehicle. Alternatively, the lane change assisting apparatus 100 may be implemented separately from the internal control units of the vehicle and may be connected with the internal control units of the vehicle through an additional connection unit.

The lane change assisting apparatus 100 may distinguish one of one or more lane change steps depending on a position of a host vehicle when changing a lane, and may control the output of warning for each lane change step when a dangerous situation occurs. In particular, the lane change assisting apparatus 100 may assist the lane change without outputting a warning when a vehicle body of the host vehicle is completely inside a target lane. In addition, the lane change assisting apparatus 100 may determine whether to output the warning, depending on an elapsed time condition or the position condition of the center of a vehicle after the host vehicle is positioned on the boundary line of the target lane, when the host vehicle is positioned on a boundary line of the target lane. In other words, the lane change assisting apparatus 100 may assist the lane change without outputting the warning, when satisfying at least one of the elapsed time condition or the position condition of the center of the vehicle after positioned on the boundary line of the target lane.

The lane change assisting apparatus 100 may include a communication part 110, a storage 120, a display 130, and a processor 140.

The communication part 110, which is a hardware device implemented with various electronic circuits to transmit or receive a signal through wireless or wired connection, may make V2I communication through an in-vehicle network communication technology or, wireless Internet access or short range communication technology with an external server of a vehicle, an infrastructure, and other vehicles. In this case, the vehicle network communication technology may include a controller area network (CAN) communication technology, a local interconnect network (LIN) communication technology, a FlexRay communication technology, and in-vehicle communication may be performed through the above communication technology. The wireless Internet technology may include a wireless LAN (WLAN), a wireless broadband (Wibro), a Wi-Fi, World Interoperability for Microwave Access (Wimax). The short range communication technology may include Bluetooth, ZigBee, ultra wideband (UWB), radio frequency identification (RFID), or infrared data association (IrDA).

For example, the communication part 110 may share vehicle information with the sensing device 200 of a vehicle and a device (e.g., a navigation device) inside the vehicle. In this case, the vehicle information may include a vehicle yaw rate, a vehicle speed, information on an obstacle around the vehicle, the relative speed to the obstacle, the relative distance to the obstacle, and information on position of the host vehicle.

The storage 120 may store the sensing result of the sensing device 200 and data or algorithms (i.e., a set of instructions) executed by the processor 140 to operate. For example, the storage 120 may store information on a warning level, and information on a threshold value for determining one or more lane change steps.

The storage 120 may be implemented with at least one storage medium of a memory in a flash memory type, a hard disk type, a micro type, the type of a card (e.g., a Security Digital (SD) card or an eXtreme digital card), a Random. Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, or an optical disk-type memory.

The display 130 may include an input device to receive a control command from a user and an output device to output the operation state and the operation result of the lane change assisting apparatus 100. In this case, the input device may include a key button, and may include a mouse, a joystick, a jog shuttle, a stylus pen, or the like. In addition, the input device may include a soft key implemented on a display. The output device may include a display and may include a voice output device such as a speaker. When a touch sensor product, such as a touch film, a touch sheet, a touch pad, or the like, is included in the display, the display may operate as a touch screen, and the input device and the output device may be implemented in the integral form. According to the present disclosure, the output device may output warning information (a warning screen or a warning wording) separately from the warning device 400 and may output necessary information (information for starting to assist lane change, or information for terminating assisting the lane change) when performing a function (lane change assist function) of assisting the lane change.

In this case, the display may include at least one of a liquid crystal display (LCD), a thin film transistor-liquid crystal display (TFT LCD), an organic light-emitting diode (OLED), a flexible display, a field emission display (FED), or a three dimensional display (3D display).

The processor 140 may be electrically connected with the communication part 110, the storage 120, the display 130, and the like, may electrically control each component, and may be an electric circuit that executes software command. Accordingly, the processor 140 may perform various data processing and calculation, to be described below.

Accordingly, the processor 140 may process signals transmitted/received between components of the lane change assisting apparatus 100. The processor 140 may be, for example, an electronic control unit (ECU), a micro controller unit (MCU), or another lower-level controller mounted in the vehicle.

The processor 140 may classify one of one or more lane change steps for the lane change based on a position of a host vehicle in an original lane and a target lane when changing a lane from the original lane to the target lane, and may determine whether to output a warning of a dangerous situation in each lane change step of the plurality of lane change steps based on whether a dangerous situation occurs.

In addition, the processor 140 may continuously flicker a turn indicator until the completion of lane change control from the time point of starting the lane change control when the lane change is performed.

The processor 140 may assist the lane change without outputting the warning depending on the driving situation, when the host vehicle is positioned on or goes over the boundary line of a target lane.

In other words, the processor 140 may determine whether to output the warning, depending on an elapsed time condition or the position condition of the center of a vehicle after the host vehicle is positioned on the boundary line of the target lane, when the host vehicle is positioned on a boundary line of the target lane, and may assist the lane change without outputting the warning, when satisfying at least one of the elapsed time condition or the position condition of the center of the vehicle after the host vehicle is positioned on the boundary line of the target lane.

In addition, the processor 140 may assist the lane change without outputting the warning when the host vehicle goes over the boundary line of the target lane after positioned on the boundary line of the target lane, that is, when the host vehicle is completely inside the target lane.

However, the processor 140 may control the output of the warning, when the warning is being output immediately before the host vehicle is completely inside the target lane, or when the flickering of the turn indicator is sensed after the host vehicle is completely inside the target lane.

One or more lane change steps may include a first step in which a host vehicle continues to follow the center of the original lane, a second step in which the host vehicle moves from the center of the original lane to the target lane until a first tire among a plurality of tires of the host vehicle begins to cross the boundary line of the target lane, a third step in which the first tire of the host vehicle is positioned on the boundary line of the target lane and the host vehicle continues to move toward the target lane until each tire of the plurality of tires of the host vehicle crosses the boundary line of the target lane, and a fourth step in which each tire of the plurality of tires of the host vehicle has crossed the boundary line of the target lane and the host vehicle continues to move until the first tire of the host vehicle enters the center of the target lane. The one or more lane change steps will be described later with reference to FIGS. 3 and 4.

The processor 140 may output warning and control the host vehicle to return to the original lane in the first step or the second step when a dangerous situation occurs. In this case, the dangerous situation may include the risk of collision with a surrounding obstacle during lane change.

The processor 140 may output warning and continuously perform lane change control in the third step. In addition, the processor 140 may continuously perform the lane change control without outputting the warning even though the turn indicator is being flickered, in the fourth step.

In addition, the processor 140 may perform, in the third step, the lane change control without outputting warning even though the turn indicator is being flickered when an elapsed time after entering into the third step exceeds a preset time, or when the position of the center of the host vehicle inside the lane after entering into the third step exceeds a preset reference value.

The processor 140 may output warning and continuously perform the lane change control when the elapsed time after entering into the third step does not exceed the preset time, and when the position of the center of the host vehicle inside the lane after entering into the third step does not exceed the preset reference value.

Referring to FIG. 2, the processor 140 may include a lane change determining part 131, a turn indicator controller 132, a lane change assist function determining part 133, and a BCW determining part 134.

The lane change determining part 131 determines a time point that the lane change is necessary and outputs the determination result. The lane change determining part 131 may determine the time point that the lane change is necessary, depending on the input of a turn indicator by a driver, a determination result of Hands on and Hands off, or a setting route.

The turn indicator controller 132 may generate and output a signal necessary to flicker or maintain the turn indicator in a direction of changing the lane. The turn indicator controller 132 may output the signal by determining whether a driver manipulates a switch of the turn indicator.

The lane change assist function determining part 133 may determine a situation desired to perform the lane change assist function by using a signal, which is output from the lane change determining part 131, of notifying the time point that the lane change is desired and an output from various sensors mounted on the vehicle. In this case, the situation desired to perform the lane change assist function may include an operating condition, or collision determination information. In addition, the lane change assist function determining part 133 may generate and output a signal desired to generate a route, control a vehicle, or perform a displaying function for the lane change. The lane change assist function determining part 133 transmits a signal for distinguishing between the lane change steps to the BCW determining part 134.

The lane change determining part 131 may distinguish between the lane change steps by determining whether the tire of the host vehicle is positioned on or out of the boundary line of the target lane.

The lane change assisting apparatus 100 may determine whether the host vehicle is positioned on the boundary line of the target lane, at the moment at which a condition as in following Equation 1 is satisfied.

$$\text{Distance from vehicle center to boundary line of lane} - \frac{\text{vehicle overall width}}{2} \leq \text{Distance}_{Thre1} \qquad \text{Equation 1}$$

The lane change assisting apparatus 100 determines whether the host vehicle is out of the boundary line of the target lane, at the moment at which a condition as in following Equation 2 is satisfied.

$$\text{Distance from vehicle center to boundary line of lane} - \frac{\text{vehicle overall width}}{2} \geq \text{Distance}_{Thre2} \qquad \text{Equation 2}$$

The BCW determining part 134 may transmit a warning signal to the warning device 400 when collision is predicted on the assumption that a lane is changed in the direction that the turn indicator is flickered, by using the signal output from the turn indicator controller 132 and a sensor mounted in a vehicle.

The BCW determining part 134 may transmit the warning signal when collision is predicted on the assumption that a lane is changed, by constantly checking the left and the right of the vehicle even though there is absent an output from the turn indicator controller 132. In this case, the type or the intensity of the warning may be varied depending on the driving situation such as whether the turn indicator is flickered.

The sensing device 200 may include at least one sensor to detect an obstacle, such as a preceding vehicle, positioned around the host vehicle, and to measure a distance to the obstacle or a speed relative to the obstacle.

The sensing device 200 may include a plurality of sensors to detect an external object of the vehicle, and may obtain information the position of the external object, the speed of the external object, a moving direction of the external object, or a type of the external object (e.g., a vehicle, a pedestrian, a bicycle or a motorcycle). To this end, the sensing device 200 may include an ultrasonic sensor, a radar, a camera, a laser scanner or a corner radar, a LiDAR, an acceleration sensor, a yaw rate sensor, a torque measurement sensor or a wheel speed sensor, and a steering angle sensor.

The vehicle control device 300 may be configured to control the steering (a longitudinal direction or a transversal direction) of the vehicle, a vehicle speed, braking, or engine driving, and may include a steering wheel, an actuator linked to the steering wheel, a controller to control the actuator, a controller to control the brake, and a controller to control the speed of the vehicle.

The warning device 400 may be controlled by the lane change assisting apparatus 100 to output a visible, tactile, or audible warning. The warning device 400 may output warnings with various types and intensities depending on the driving situation such as whether the turn indicator is flickered. In addition, the warning device 400 may include Blind-spot Collision Warning (BCW).

Figure 3:
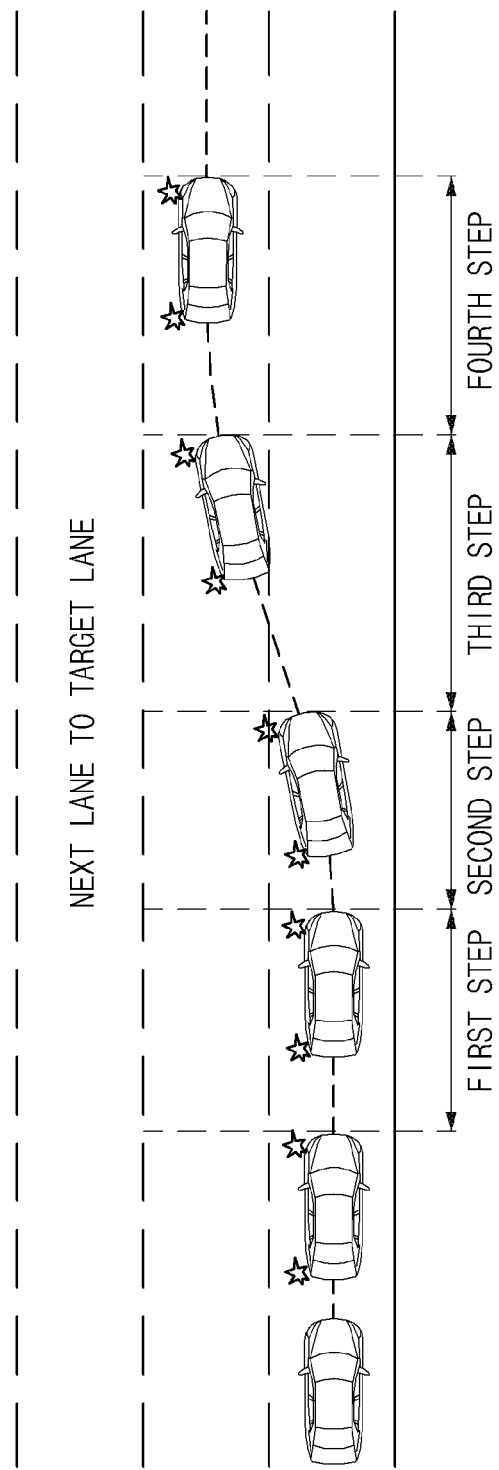
FIG. 3 is a view illustrating lane change steps in lane change.
Figure 4:
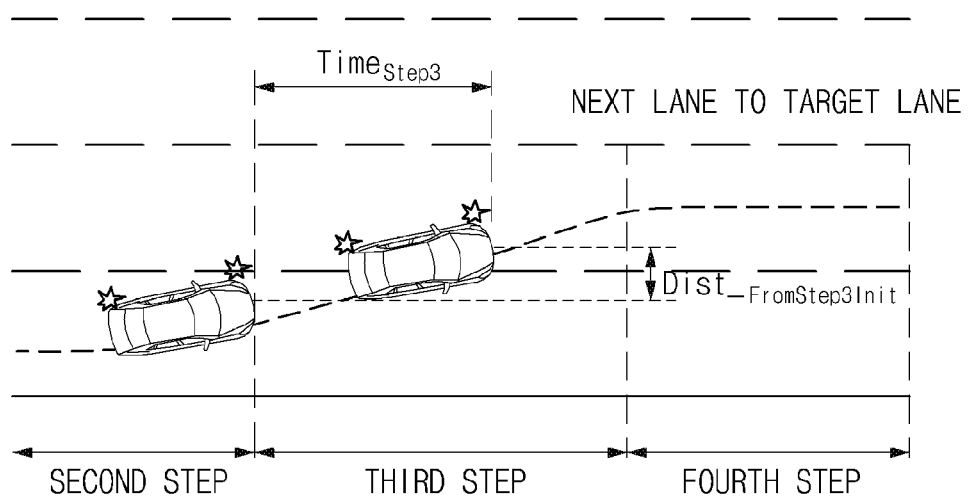
FIG. 4 is a view illustrating a screen to explain warning output when entering into the third step and the fourth step in the lane change.

FIG. 3 is a view illustrating lane change steps in lane change, according to one form of the present disclosure, and FIG. 4 is a view illustrating warning output when entering into the third step and the fourth step in the lane change, according to another form of the present disclosure.

Referring to FIG. 3, the following description will be made regarding that steps of changing from the original lane (the lane in which the host vehicle is traveling) to the target lane is divided into four steps, when assisting the lane change. The first step, which is a step that a host vehicle keeps following the center of the original lane, refers to a step when one second or more is elapsed after starting the lane change assist function. The second step, which is a step in which the host vehicle moves from the center of the original lane to the target lane until a first tire among a plurality of tires of the host vehicle begins to cross the boundary line of the target lane, include a state that the host vehicle is travelling inside the original lane. The third step is a step in which the first tire of the host vehicle is positioned on the boundary line of the target lane and the host vehicle continues to move toward the target lane until each tire of the host vehicle is completely out of the boundary line of the target lane (e.g., each tire of the host vehicle crosses the boundary line of the target lane). The fourth step, which is a step in which each tire of the plurality of tires of the host vehicle has crossed the boundary line of the target lane and the host vehicle continues to move until the first tire of the host vehicle enters a center of the target lane, refers to that the host vehicle is completely inside the target lane.

The lane change assisting apparatus 100 may control the host vehicle to return to the original lane when warning (BCW warning) occurs as surrounding collision is predicted in the first step or the second step. In this case, in the first step or the second step, since the host vehicle is travelling inside the original lane, when warning is output, a vehicle predicted to collide with the host vehicle may be present with high probability inside the target lane. Accordingly, the lane change assisting apparatus 100 may output the warning.

The lane change assisting apparatus 100 may determine whether to output the warning using the elapsed time or the position of the center of the vehicle after entering into the third step, so as to prevent the warning from being unnecessarily output due to a vehicle travelling present on a next lane to the target lane, because the vehicle predicted to collide with the host vehicle may be present on the target lane or the next lane to the target lane, when the warning is output in the third step that the host vehicle enters the target lane.

In this case, the lane change assisting apparatus 100 may stop the output of the warning when the elapsed time ($Time_{step3}$) and the position ($Dist_{FromStep3Init}$) of the vehicle, after entering the third step are greater than respective threshold values, respectively, as in following Equation 3.

$$\text{Time condition } (A): Time_{Step3} \geq Time_{threshold}$$

$$\text{Position condition}(B): Dist_{FromStep3Init} \geq Distance_{Thre3} \quad \text{Equation 3}$$

In Equation 3, the time condition (A) and the position condition (B) are separately used or used through the OR logic operation (A or B). Accordingly, the lane change assisting apparatus 100 may prevent the warning from being output when one of two conditions is true.

The position of the center of the vehicle at the initial point of the third step, which is used to determine the position condition, may have the relative relationship with the boundary line of the target lane, which makes the relative distance relationship between the center of the original lane and the center of the target lane.

The lane change assisting apparatus 100 prevents the warning from being output because the vehicle predicted to collide with the host vehicle may be present with the high probability on the next lane to the target lane, when the warning is output in the fourth step which is the step that the host vehicle is completely inside the target lane.

However, the lane change assisting device 100 may allow the warning to be output when the host vehicle is already outputting the warning before entering into the fourth step or when the input for the turn indicator by the driver is detected after entering into the fourth step.

Figure 5:
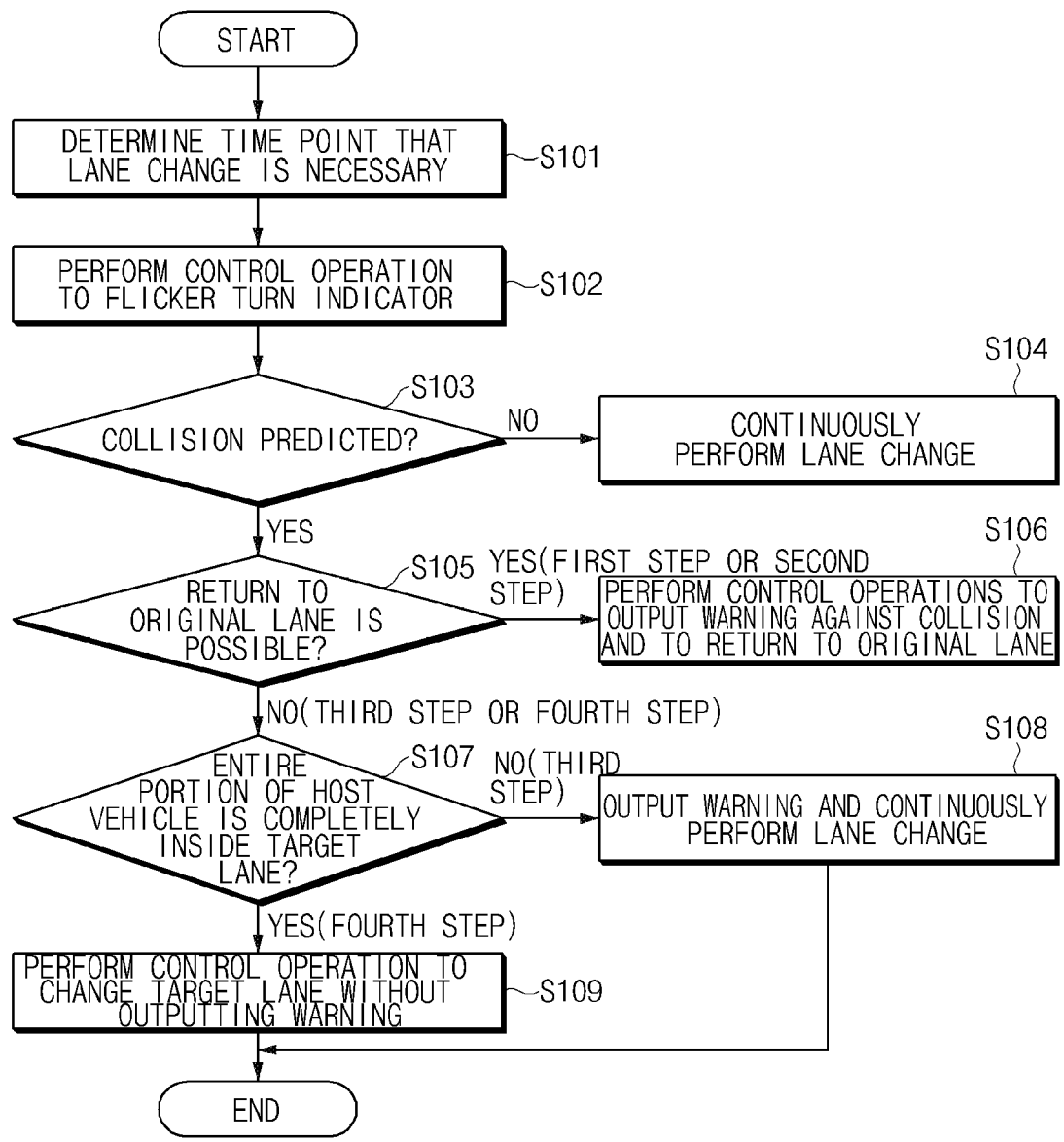
FIG. 5 is a flowchart illustrating a method for assisting lane change.

Hereinafter, a method for assisting lane change will be described with reference to FIG. 5, according to one form of the present disclosure. FIG. 5 is a flowchart illustrating a method for assisting lane change, according to another form of the present disclosure.

Hereinafter, it is assumed that the lane change assisting apparatus 100 of FIG. 1 performs the process of FIG. 5. In addition, in the description made with reference to FIG. 5, it may be understood that operations described as being performed by an apparatus are controlled by the processor 140 of the lane change assisting apparatus 100.

Referring to FIG. 5, the lane change assisting apparatus 100 may determine a time point that the lane change is necessary (S101). In this case, the lane change assisting apparatus 100 may determine a time point that the lane change is necessary, depending on the input for the turn indicator, a determination result of Hands on and Hands off, or a setting route.

The lane change assisting apparatus 100 performs a control operation to flicker the turn indicator, when the time point that the lane change is necessary comes (S102). In this case, the turn indicator may be continuously flickered during the control operation to assist the lane change.

The lane change assisting apparatus 100 determines a collision situation in the lane change (S103) and performs the lane change when the collision situation is not predicted (S104).

The lane change assisting apparatus 100 determines whether the return to an original lane is possible (S105), when the collision situation is predicted. In this case, the lane change assisting apparatus 100 may determine whether the host vehicle is able to return to the original lane by determining whether the state of the host vehicle corresponds to the first step or the second step, which refer to the travelling of the host vehicle inside the lane of the host vehicle. In other words, the lane change assisting apparatus 100 may determine that the host vehicle is able to return to the original lane when the state of the host vehicle corresponds to the first step or the second step. To the contrast, the lane change assisting apparatus 100 may determine that the host vehicle is unable to return to the original lane, when the host vehicle is positioned on the boundary line of the target lane, partially enters the target lane, or completely inside the target lane. In addition, the lane change assisting apparatus 100 may determine whether the state of the host vehicle corresponds to the first step or the second step, by taking into consideration the information on the position of the host vehicle, or information on whether the host vehicle is positioned on the boundary line of the target lane.

Accordingly, when the host vehicle is able to return to the original lane (is in the first step or the second step), the lane change assisting apparatus 100 performs control operations to output the warning against the collision and to return to the original lane (S106).

To the contrary, when the host vehicle is unable to return to the original lane (is in the third step or fourth step), the lane change assisting apparatus 100 determines whether the entire portion of the host vehicle is completely inside the target lane (S107).

Therefore, when the entire portion of the host vehicle is not completely inside the target lane, the lane change assisting apparatus 100 determines the state of the host vehicle as corresponding to the third step, outputs a warning, and continuously performs the lane change (S108).

Meanwhile, when the entire portion of the host vehicle is not completely inside the target lane, the lane change assisting apparatus 100 determines the state of the host vehicle as corresponding to the fourth step, and continuously performs the lane change without outputting the warning (S109).

As described above, according to the present disclosure, the control operations are performed to output the warning depending on a warning situation till the step (the first step or the second step) that the host vehicle is able to return to the original lane for reasons such as collision during performing the lane change assist function and to return to the original lane.

However, when the warning situation occurs in the step (the third step or fourth step) that the host vehicle is unable to return to the original lane, it is determined whether the entire portion of the vehicle is completely inside the target lane. When the entire portion of the vehicle is not completely inside the target lane, the lane change assist function is continuously performed and the warning is generated. When the entire portion of the vehicle is completely inside the target lane, the warning is not output even though the turn indicator is being flickered. Therefore, according to the present disclosure, the unnecessary warning may be avoided or minimized in the lane change control, thereby enhancing the convenience of the driver.

Figure 6:
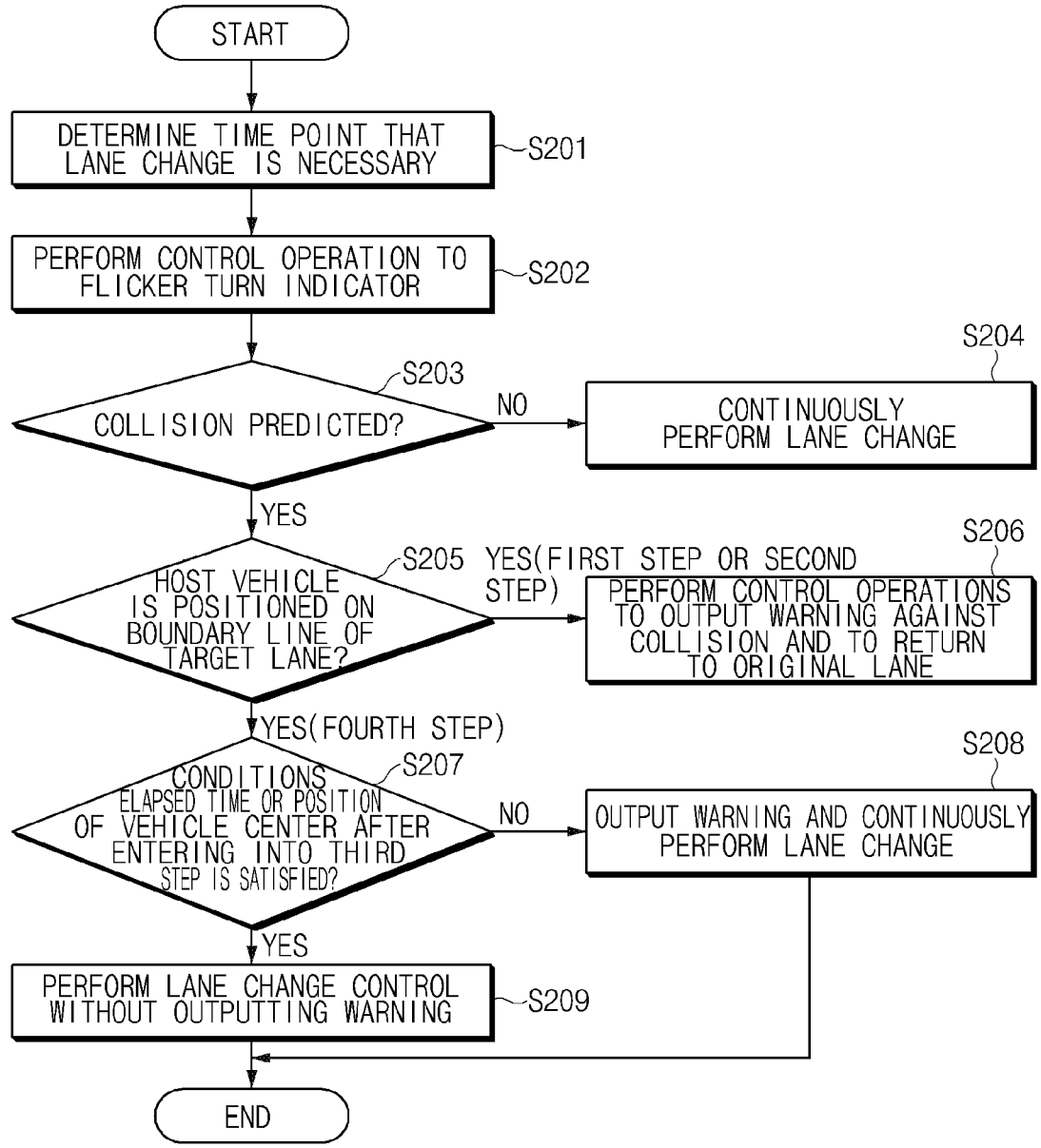
FIG. 6 is a flowchart illustrating a method for assisting lane change.

Hereinafter, a method for assisting lane change will be described with reference to FIG. 6, according to one form of the present disclosure. FIG. 6 is a flowchart illustrating a method for assisting lane change, according to another form of the present disclosure.

Hereinafter, it is assumed that the lane change assisting apparatus 100 of FIG. 1 performs the process of FIG. 6. In addition, in the description made with reference to FIG. 6, it may be understood that operations described as being performed by an apparatus are controlled by the processor 140 of the lane change assisting apparatus 100.

Referring to FIG. 6, the lane change assisting apparatus 100 may determine a time point that the lane change is necessary (S201). In this case, the lane change assisting apparatus 100 may determine a time point that the lane change is necessary, depending on the input for the turn indicator, a determination result of Hands on and Hands off, or a setting route.

The lane change assisting apparatus 100 performs a control operation to flicker the turn indicator, when the time point that the lane change is necessary comes (S202).

The lane change assisting apparatus 100 determines a collision situation in the lane change (S203) and performs the lane change when the collision situation is not predicted (S204).

The lane change assisting apparatus 100 may determine whether the host vehicle is positioned on the boundary line of the target lane, when the collision situation is predicted (S205). In this case, the lane change assisting apparatus 100 determines that the state of the host vehicle corresponds to the first step or the second step, and performs control operations to output the warning against the collision and to return to the original lane, when the host vehicle is not positioned on the boundary line of the target lane (S206).

The lane change assisting apparatus 100 may determine the state of the host vehicle as corresponding to the third step, may enter into the third step, and may determine whether the conditions of the elapsed time and the position of the center of the host vehicle are satisfied, when the host vehicle is not positioned on the boundary line of the target lane (S207).

The lane change assisting apparatus 100 performs control operations to output the warning against the collision predicted and to continuously perform the lane change, when the conditions of the elapsed time and the position of the center of the host vehicle after entering into the third step are not satisfied (S208). In this case, although the forms have been disclosed in that one of the elapsed time condition or the position condition of the center of the host vehicle is taken into condition, whether to output the warning may be determined by separately taking into consideration the above conditions one by one.

The lane change assisting apparatus 100 may continuously perform the lane change control without the warning, when one of the conditions of the elapsed time and the position of the center of the host vehicle, after entering into the third step is satisfied (S208).

As described above, according to one form of the present disclosure, as illustrated in FIG. 5, even though the host vehicle is not completely inside the target lane, when collision is predicted in lane change, and when the host vehicle is in the third step, which is the lane change step, that is, the hoist vehicle is positioned on the boundary line of the target lane, the condition of the elapsed time or the position condition of the center of the host vehicle, after entering into the third step is considered. In this case, the warning is output when the condition of the elapsed time after the entrance into the third step or the position condition of the center of the host vehicle fails to satisfy a preset condition, and otherwise, the lane change control is performed without the warning as in the fourth step, thereby minimizing the unnecessary warning to enhance the convenience of the driver.

Figure 7:
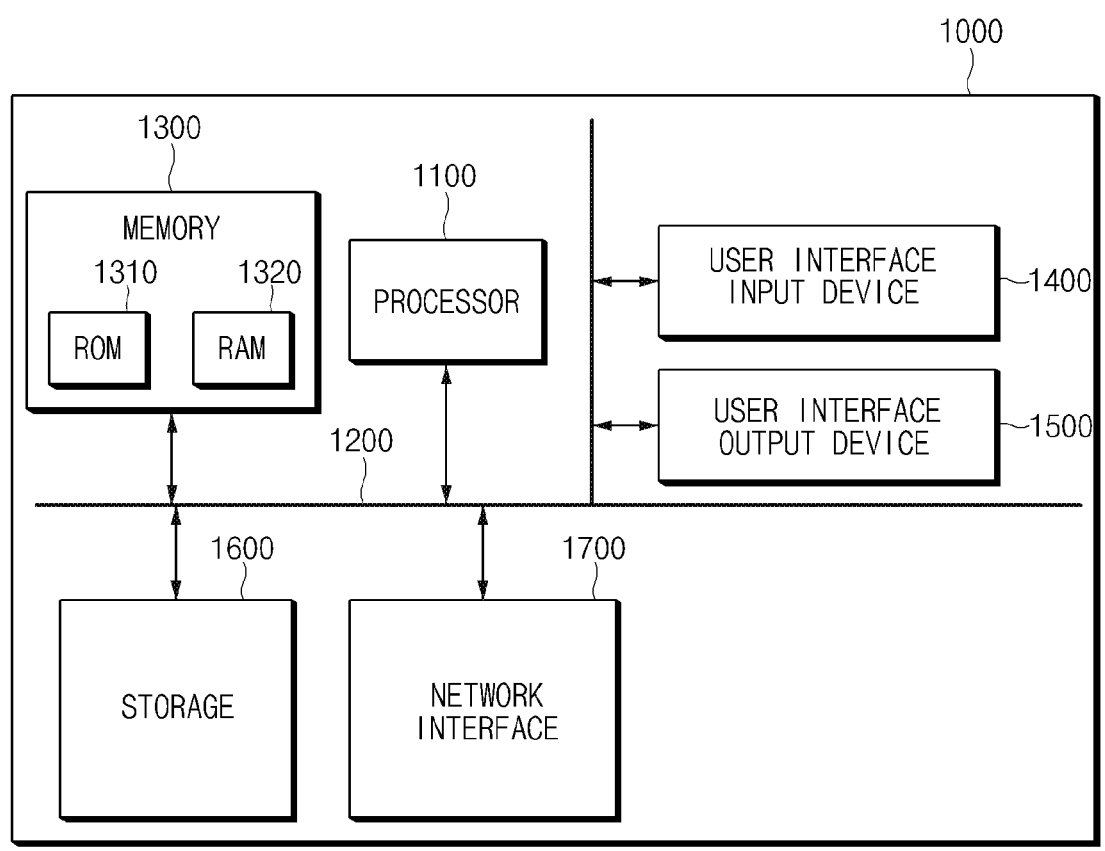
FIG. 7 illustrates a computing system.

FIG. 7 illustrates a computing system, according to one form of the present disclosure.

Referring to FIG. 7, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the forms disclosed in the present disclosure may be directly implemented with a hardware module, a software module, or the combinations thereof, executed by the processor 1100. The software module may reside on a storage medium (i.e., the memory 1300 or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

As described above, according to the present disclosure, the convenience of the driver may be enhanced by determining the unnecessary warning output situation in each lane change step and performing the lane change without outputting the warning.

Besides, a variety of effects directly or indirectly understood through the disclosure may be provided.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

Therefore, forms of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

What is claimed is:

1. An apparatus for assisting a lane change, the apparatus comprising:
   a storage configured to store information for the lane change; and
   a processor configured to:
      classify a plurality of lane change steps for the lane change from a position of a host vehicle in an original lane to a target lane,
      determine whether to output a warning of a dangerous situation in each lane change step of the plurality of lane change steps,
      when the host vehicle is positioned on a boundary line of the target lane or goes over the boundary line of the target lane, assist the lane change without outputting the warning based on a driving situation, and
      when the host vehicle is entirely positioned inside the target lane, assist the lane change such that the host vehicle enters a center of the target lane without outputting the warning based on the driving situation.

2. The apparatus of claim 1, wherein the processor is configured to:
   when the host vehicle is positioned on the boundary line of the target lane, determine whether to output the warning based on an elapsed time or a position of a center of the host vehicle after the host vehicle is positioned on the boundary line of the target lane.

3. The apparatus of claim 2, wherein the processor is configured to:
   when the elapsed time exceeds a preset time or the position of the center of the host vehicle after the host vehicle is positioned on the boundary line of the target lane exceeds a preset reference value, assist the lane change without outputting the warning.

4. The apparatus of claim 1, wherein the processor is configured to:
   output the warning when the warning is being output before the host vehicle is entirely positioned inside the target lane, or when flickering of a turn indicator is sensed after the host vehicle is entirely positioned inside the target lane.

5. The apparatus of claim 1, wherein the plurality lane change steps comprises:
   a first step in which the host vehicle continues to follow a center of the original lane;
   a second step in which the host vehicle moves from the center of the original lane to the target lane until a first tire among a plurality of tires of the host vehicle begins to cross the boundary line of the target lane;
   a third step in which the first tire of the host vehicle is positioned on the boundary line of the target lane and the host vehicle continues to move toward the target lane until each tire of the plurality of tires of the host vehicle crosses the boundary line of the target lane; and
   a fourth step in which each tire of the plurality of tires of the host vehicle has crossed the boundary line of the target lane and the host vehicle continues to move until the first tire of the host vehicle enters the center of the target lane.

6. The apparatus of claim 5, wherein the processor is configured to:
   when the dangerous situation occurs, output the warning and control the host vehicle to return to the original lane in the first step or the second step.

7. The apparatus of claim 5, wherein the processor is configured to:
   output the warning and continuously perform the lane change in the third step.

8. The apparatus of claim 5, wherein the processor is configured to:
continuously perform the lane change without outputting the warning in the fourth step.

9. The apparatus of claim 5, wherein the processor is configured to:
perform the lane change such that the host vehicle enters the center of the target lane without outputting the warning when an elapsed time after entering into the third step exceeds a preset time, or when a position of a center of the host vehicle inside the target lane exceeds a preset reference value, in the third step.

10. The apparatus of claim 5, wherein the processor is configured to:
output the warning and continuously perform the lane change such that the host vehicle enters the center of the target lane when an elapsed time after entering into the third step does not exceed a preset time, and when a position of a center of the host vehicle inside the target lane does not exceed a preset reference value.

11. The apparatus of claim 1, wherein the processor is configured to:
continuously flicker a turn indicator until completion of the lane change from a time point of starting the lane change.

12. A vehicle system comprising:
a lane change assisting apparatus configured to:
divide a lane change from an original lane in which a host vehicle is currently driving to a target lane to which the host vehicle makes a lane change into a plurality of lane change steps,
control a warning of a dangerous situation in each lane change step of the plurality of lane change steps,
when the host vehicle is positioned on a boundary line of a target lane or goes over the boundary line of the target lane, assist the lane change without outputting the warning based on a driving situation, and
when the host vehicle is entirely positioned inside the target lane, assist the lane change such that the host vehicle enters a center of the target lane without outputting the warning based on the driving situation; and
a warning device controlled by the lane change assisting apparatus to output the warning.

13. The vehicle system of claim 12, wherein the warning device includes Blind-spot Collision Warning (BCW).

14. The vehicle system of claim 12, wherein the warning device is configured to control a type of the warning or an intensity of the warning based on the driving situation.

15. A method for assisting a lane change, the method comprising:
classifying, by a processor, a plurality of lane change steps for the lane change from a position of a host vehicle in an original lane to a target lane;
determining, by the processor, whether to output a warning of a dangerous situation in each lane change step of the plurality of lane change steps;
when the host vehicle is positioned on a boundary line of a target lane or goes over the boundary line of the target lane, assisting, by the processor, the lane change without outputting the warning based on a driving situation; and
when the host vehicle is entirely positioned inside the target lane, assisting, by the processor, the lane change such that the host vehicle enters a center of the target lane without outputting the warning based on the driving situation.

16. The method of claim 15, wherein assisting the lane change without outputting the warning further includes:
when the host vehicle is positioned on the boundary line of the target lane, determining whether to output the warning based on an elapsed time or a position condition of a center of the host vehicle after the host vehicle is positioned on the boundary line of the target lane.

17. The method of claim 15, wherein assisting the lane change without outputting the warning includes:
when an elapsed time exceeds a preset time or a position of a center of the host vehicle after the host vehicle is positioned on the boundary line of the target lane exceeds a preset reference value, assisting the lane change without outputting the warning.

18. The method of claim 15, wherein the plurality of lane change steps includes:
a first step in which the host vehicle continues to follow a center of the original lane;
a second step in which the host vehicle moves from the center of the original lane to the target lane until a first tire among a plurality of tires of the host vehicle begins to cross the boundary line of the target lane;
a third step in which the first tire of the host vehicle is positioned on the boundary line of the target lane and the host vehicle continues to move toward the target lane until each tire of the plurality of tires of the host vehicle crosses the boundary line of the target lane; and
a fourth step in which each tire of the plurality of tires of the host vehicle has crossed the boundary line of the target lane and the host vehicle continues to move until the first tire of the host vehicle enters a center of the target lane.

19. The method of claim 15, further comprising:
continuously flickering, by the processor, a turn indicator until completion of the lane change from a time point of starting the lane change.

* * * * *